United States Patent
Sharma

(10) Patent No.: US 9,794,609 B2
(45) Date of Patent: Oct. 17, 2017

(54) CROSS-MEDIA DISTRIBUTION OF ADVERTISEMENTS

(71) Applicant: Alcatel-Lucent USA Inc., Murray Hill, NJ (US)

(72) Inventor: Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 48 days.

(21) Appl. No.: 14/305,774

(22) Filed: Jun. 16, 2014

(65) Prior Publication Data
US 2015/0365711 A1    Dec. 17, 2015

(51) Int. Cl.
| | |
|---|---|
| *H04N 21/2668* | (2011.01) |
| *H04N 21/81* | (2011.01) |
| *H04N 21/258* | (2011.01) |
| *H04N 21/254* | (2011.01) |
| *H04N 21/462* | (2011.01) |

(Continued)

(52) U.S. Cl.
CPC ....... *H04N 21/2668* (2013.01); *H04N 21/254* (2013.01); *H04N 21/25891* (2013.01); *H04N 21/44222* (2013.01); *H04N 21/4622* (2013.01); *H04N 21/6582* (2013.01); *H04N 21/812* (2013.01); *H04N 21/64322* (2013.01)

(58) Field of Classification Search
CPC ........... H04N 21/4524; H04N 21/4532; H04N 21/44222; H04N 21/4126; H04N 21/25891; H04N 21/2668; H04N 21/4108; H04N 21/435; H04N 21/812
See application file for complete search history.

(56) References Cited

U.S. PATENT DOCUMENTS

| | | | |
|---|---|---|---|
| 2009/0300675 A1* | 12/2009 | Shkedi ............... | H04N 7/17318 725/34 |
| 2010/0325659 A1* | 12/2010 | Shkedi ............... | G06Q 30/0241 725/34 |

(Continued)

OTHER PUBLICATIONS http://www.ad-id.org/news-announcements/negotiations-between-sag-aftra-ana-and-4as-result-mandate-ad-id-all-commercial.

(Continued)

*Primary Examiner* — Benjamin R Bruckart
*Assistant Examiner* — Susan X Li
(74) *Attorney, Agent, or Firm* — Duft Bornsen & Fettig, LLP

(57) ABSTRACT

Systems and methods that provide targeted advertisements to users. One example is an ad selection controller for a first media channel that provides content to a user. To select an advertisement in the first media channel, the ad selection controller transmits a query to a back-end system of a second media channel that also provides content to the user to determine an advertisement(s) selected for the user in the second media channel. The ad selection controller receives a response from the back-end system that includes an advertisement identifier for the advertisement selected in the second media channel. The advertisement in the second media channel is referenced by an advertisement identifier that is global across multiple media channels. The ad selection controller then selects an advertisement for the user in the first media channel based on the advertisement selected in the second media channel, and provides the advertisement to the user.

6 Claims, 7 Drawing Sheets

(51) Int. Cl.
   *H04N 21/442*     (2011.01)
   *H04N 21/658*     (2011.01)
   *H04N 21/643*     (2011.01)

(56) References Cited

U.S. PATENT DOCUMENTS

2012/0096491 A1* 4/2012 Shkedi ............... H04N 21/4532
                                                        725/35
2013/0031582 A1* 1/2013 Tinsman ............ H04N 21/2353
                                                        725/36
2014/0189732 A1* 7/2014 Shkedi ............... H04N 21/4524
                                                        725/34

OTHER PUBLICATIONS

Society of Cable Telecommunications Engineers, ANSI/SCTE 30 2009, Digital Program Insertion Splicing API.
Society of Cable Telecommunications Engineers, ANSI/SCTE 35 2013a, Digital Program Insertion Cueing Message for Cable.
Society of Cable Telecommunications Engineers, SCTE 104 2014, Automation System to Compression System Communications Applications Program Interface (API).

* cited by examiner

| USER PROFILE (TV) |||||
|---|---|---|---|---|
| NAME/ID | SEGMENT | AD-IDs | NEXT AD-IDs | CROSS MEDIA NAME/ID |
| CZAR23 | PETS | X1, Y1, Z1 | X2, Y2, Z2 | PRINT: JOHN DOE<br>INTERNET: FBALLFAN |

| USER PROFILE ||||| 
|---|---|---|---|---|
| NAME/ID | SEGMENT | AD-IDs | NEXT AD-IDs | CROSS MEDIA NAME/ID |
| FBALLFAN | SPORTS | P2, R2, Q2 | P1, R1, Q1 | PRINT: JOHN DOE<br>TV: CZAR23 |
| 902 | 904 | 906 | 908 | 910 |

| USER PROFILE ||||| 
|---|---|---|---|---|
| NAME/ID | SEGMENT | AD-IDs | NEXT AD-IDs | CROSS MEDIA NAME/ID |
| CZAR23 | PETS | X1, Y1, Z1, P1 | X2, Y2, Z2, R1, Q1 | PRINT: JOHN DOE<br>INTERNET: FBALLFAN |
| 702 | 704 | 706 | 708 | 710 |

700

CROSS-MEDIA DISTRIBUTION OF ADVERTISEMENTS

FIELD OF THE INVENTION

The invention is related to the field of communication systems and, in particular, to distribution of advertisements to consumers.

BACKGROUND

Targeted advertising uses attributes or activities of a consumer to select an advertisement that may be of interest to that consumer. Selection of a targeted advertisement may be based on demographics (e.g., gender, age, ethnicity), psychographics (e.g., interests of a consumer), and past behaviors of the consumer (e.g., browsing history, purchase history, etc.). As an example, if a consumer (also referred to herein as a "user") is browsing the Internet, then a back-end system may track searches, queries, and past purchases of the consumer, among other means, via "cookies" that are sent to and stored on the user device. The back-end system may then use an algorithm, such as a collaborative filtering algorithm, to select advertisements to display to the consumer while browsing. For instance, if the analyzed data predicts that a consumer of a certain category frequently purchases a product 'y' after having purchased product 'x', then the back-end system may determine that someone belonging to the same category and who has purchased product 'x' is likely to purchase product 'y'. Consequently, the back-end system may select advertisements related to product 'y'.

A consumer may have access to many different media channels other than just Internet. For example, a consumer may watch television, listen to the radio, have a mobile phone, etc. Unfortunately, each media channel provides advertisements to consumers independent of the other media channels, so there is no consistency of advertising among the different media channels.

SUMMARY

Embodiments described herein provide for cross-media advertising that is targeted to a user. When a system within a media channel attempts to select an advertisement for a user, the system will query other media channels to determine what advertisements have been selected for this same user in those media channels. The system may then select a targeted advertisement for the user based on the advertisements selected in other media channels for the same user. The following embodiments provide for collaboration between the different media channels regarding advertisements that are selected for a user. Thus, the user is more likely to receive advertisements that are of interest, regardless of the media channel accessed by the user. For example, if a consumer uses an Internet search engine to search for articles on pet food, then the search engine may select advertisements related to pets. If the same consumer watches satellite television, a back-end system in the television network may query the Internet search engine to determine what advertisements were provided to the user through the search engine display. The back-end system in the television network may then provide advertisements to the user related to pets. This sharing of advertising information across different media channels allows for each media channel to more effectively focus its advertising to individual users.

One embodiment comprises an ad selection controller for a first media channel that provides content to a user. The ad selection controller is configured to transmit a query to a back-end system of a second media channel that provides content to the user, where the query is for an advertisement selected for the user in the second media channel. The ad selection controller is configured to receive a response from the back-end system of the second media channel that includes an advertisement identifier for the advertisement selected in the second media channel. The advertisement identifier, which identifies the advertisement, is global across multiple media channels. The ad selection controller is configured to select an advertisement for the user in the first media channel based on the advertisement selected in the second media channel, and to provide the advertisement selected in the first media channel to the user.

In one embodiment, the ad selection controller is configured to track activity of the user in the first media channel, and to select the advertisement for the user in the first media channel based further on the activity of the user in the first media channel.

In one embodiment, the ad selection controller is configured to determine a user identifier for the user in the second media channel, and to insert the user identifier in the query to the back-end system of the second media channel.

In one embodiment, the first media channel comprises television, and the second media channel comprises Internet. In another embodiment, the first media channel comprises radio, and the second media channel comprises Internet. In another embodiment, the first media channel comprises print media, and the second media channel comprises Internet. In another embodiment, the first media channel comprises mobile phones, and the second media channel comprises Internet.

In one embodiment, the ad selection controller is configured to receive another query from the back-end system of the second media channel for another advertisement selected in the first media channel, to access a user profile for the user to identify another advertisement identifier for the other advertisement selected in the first media channel, and to transmit another response to the back-end system of the second media channel that includes the other advertisement identifier for the other advertisement selected in the first media channel.

Another embodiment comprises a method of providing advertisements in a first media channel that provides content to a user. The method includes transmitting a query from an ad selection controller of the first media channel to a back-end system of a second media channel that provides content to the user, where the query is for an advertisement selected for the user in the second media channel. The method includes receiving a response in the ad selection controller from the back-end system of the second media channel that includes an advertisement identifier for the advertisement selected in the second media channel. The advertisement identifier is global across multiple media channels. The method includes selecting an advertisement for the user in the first media channel based on the advertisement selected in the second media channel, and providing the advertisement selected in the first media channel to the user.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 9 illustrates a user profile for a user in another media channel in an exemplary embodiment.

FIG. 10 illustrates an updated user profile for a user in an exemplary embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments.

Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
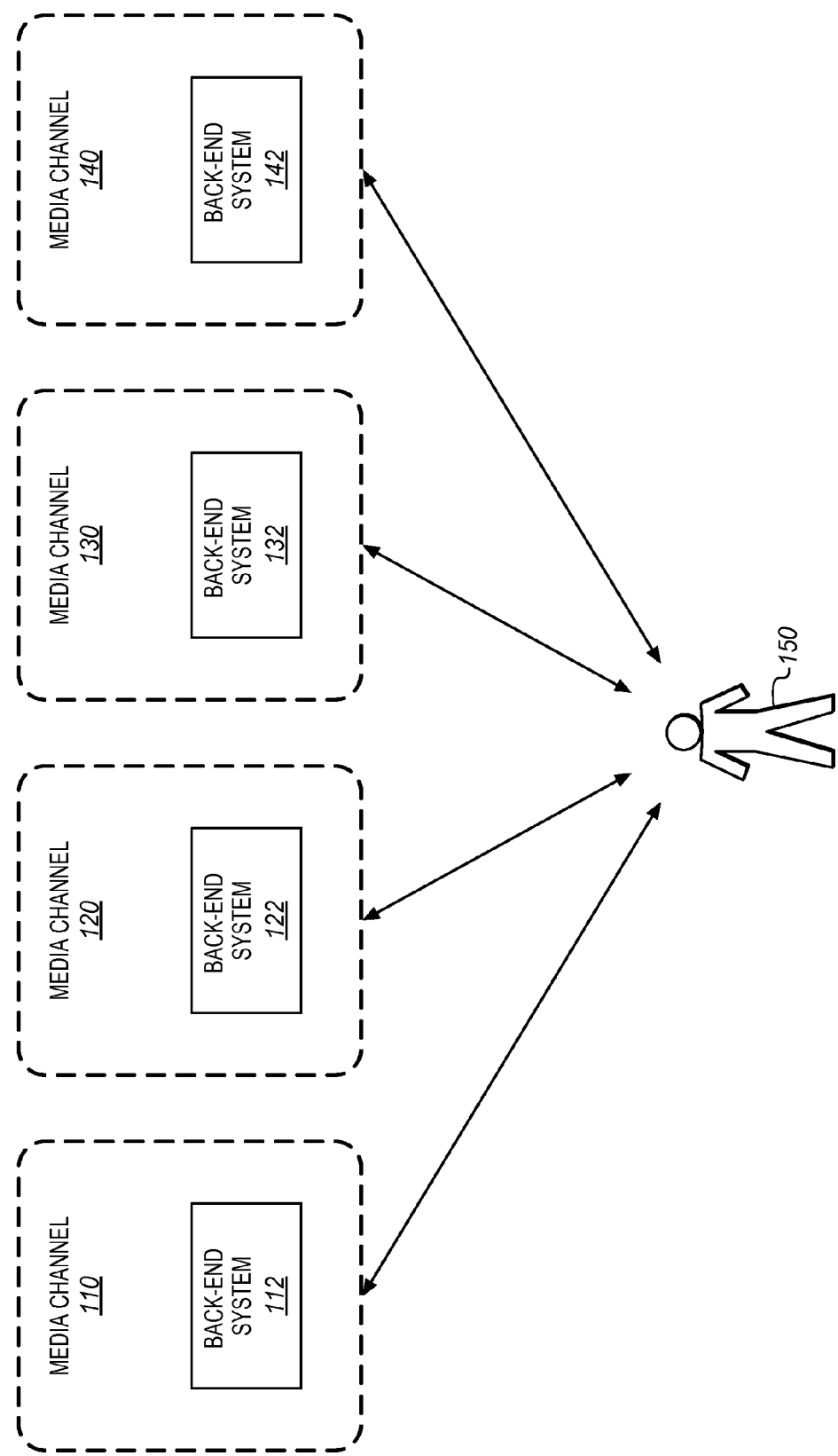
FIG. 1 illustrates a communication system in an exemplary embodiment.

FIG. 1 illustrates a communication system 100 in an exemplary embodiment. Communication system 100 includes a plurality of media channels 110, 120, 130, and 140 that provide or distribute content to a user 150 (also referred to as a consumer). A media channel is defined as a specific medium used to reach an intended consumer. Different media channels may use different (communication) mediums for distributing content (e.g., wireline, wireless, print, storage media, etc.), may use different (communication) methods for distributing content (e.g., broadcast, end-to-end, point-to-point), may use different transport protocols or transport layer for distributing (electronic) content (e.g., IP, SMS, MMS, SMPP, HTML, etc.), may provide a different experience to the consumer, may be accessible through different equipment or applications (e.g., mobile phone, PC with browser, television receiver, radio receiver, etc.), etc.

Media channels may be classified in different ways, but generally, they may be classified as: print media (e.g., books, newspapers, magazines), recordings (e.g., cassettes, CDs, DVDs), cinema, radio, television, Internet, and mobile phones. In each of these classifications, the technologies used to disseminate the content may be different. For example, in radio, the technology used to disseminate the content may involve broadcasting sound over frequency bands regulated by the FCC. With the Internet, the technology used to disseminate the content may involve packetizing the content according to Internet Protocol (IP), and routing the packets to the intended recipient(s). In another example, in television, the technology used to disseminate the content may involve broadcasting video over frequency bands (over-the-air) regulated by the FCC or over other mediums not regulated by the FCC (e.g., cable and satellite). With mobile phones, the technology used to disseminate the content may involve sending the content over a Radio Access Network (RAN) or other wireless networks to the intended recipient(s). There may be some overlap of technologies for the different media channels, but each media channel is considered independent of the others regarding how content is provided to consumers. Some of the different media channels may be owned by a common entity, or may be owned by independent entities.

User 150 is able to access content through each of the media channels 110, 120, 130, and 140. One assumption is that user 150 has equipment capable of accessing the content through each media channel 110, 120, 130, and 140. For example, if media channel 110 comprises radio, then user 150 has radio equipment to access the content. If media channel 120 comprises television, then user 150 has television equipment to access the content. If media channel 130 comprises Internet, then user 150 has a computer and associated browser to access the content. If media channel 140 comprises mobile phones, then user 150 has a cellular phone or other mobile device to access the content. When the term "user" or "consumer" is used herein, it may refer to a person and/or the equipment associated with the person.

User 150 may have an account set up within each media channel to access the content. For example, if media channel 110 comprises radio, then user 150 may have an account (e.g., an XM radio account) set up with a provider of the content over this medium. If media channel 120 comprises television, then user 150 may have an account set up through a cable or satellite provider to access content over this medium. If media channel 130 comprises Internet, then user 150 may have an account set up with Google®, Yahoo!®, an Internet Service Provider (ISP), etc., to access content. If media channel 140 comprises mobile phones, then user 150 may have an account set up with Verizon Wireless®, Sprint®, etc., to access content. Each account may identify the user differently across different media channels.

Media channels 110, 120, 130, and 140 each include a back-end system 112, 122, 132, and 142, respectively. A back-end system comprises any server, device, apparatus, or equipment (including hardware) that supports operations (that may optionally include any user authorization and authentication) for providing content through a media channel. For example, a back-end system for television or radio may include head-end equipment for distributing content. A back-end system for Internet may comprise equipment in a data center that provides a customized search engine or portal to a consumer. A back-end system for mobile phones may comprise equipment in a core network (e.g., serving gateway, application server, etc.) that provides content to a consumer.

Figure 2:
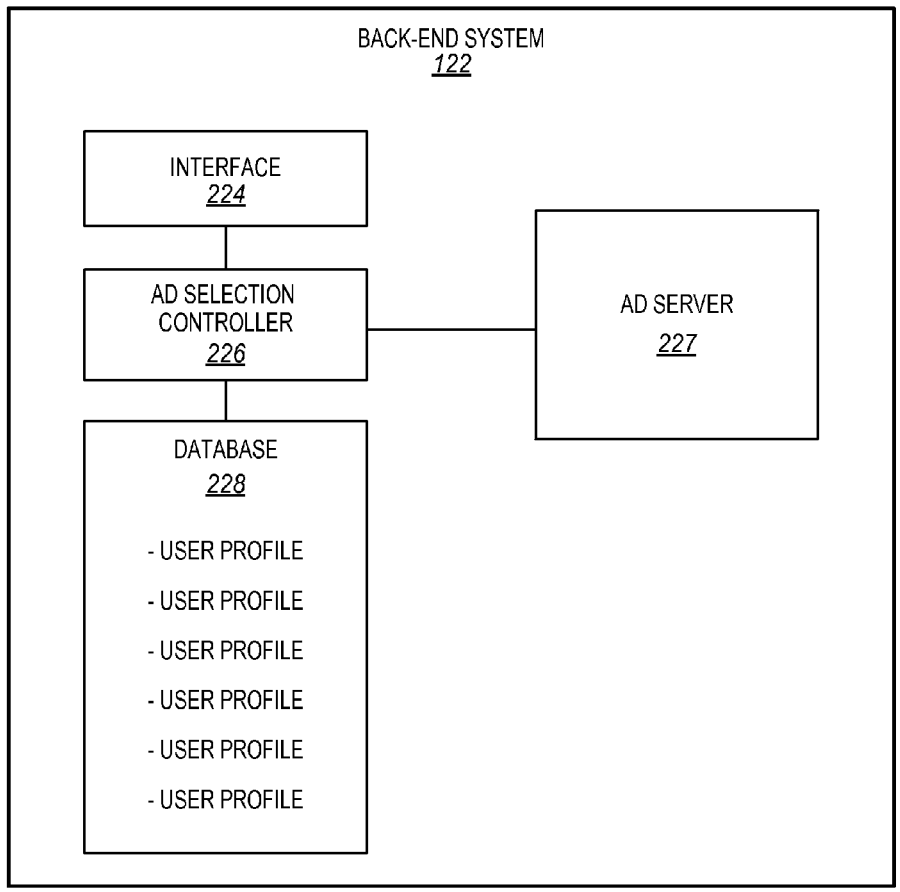
FIG. 2 illustrates a back-end system in an exemplary embodiment.

FIG. 2 illustrates a back-end system in an exemplary embodiment. Although back-end system 122 is shown in FIG. 2, other back-end systems may have a similar configuration. Back-end system 122 includes an interface 224, an ad selection controller 226, an ad server 227, and a database 228. Interface 224 comprises a component or device that communicates with other elements regarding distribution of content. Ad (advertisement) selection controller 226 comprises a component or device that selects one or more advertisements to provide to users over its respective media channel. To select an advertisement, ad selection controller 226 may track activities of users, and store information on the activities of the users. For example, if the media channel comprises the Internet, then ad selection controller 226 may track searches or purchases of a user, and store this information. Ad selection controller 226 may also store algorithms or policies for selecting advertisements for users. For example, ad selection controller 226 may store and process a collaborative filtering algorithm to recommend certain advertisements to certain users. As another example, the policy function that selects the advertisements to be sent may get its priority set to send out specific advertisements that override the algorithm for advertisements selection, or a NULL selection, that may follow a preset scheme for sending out advertisements that do not consider user interest or behavior. The latter is useful in the initial information gathering and consolidation phase on a per user basis.

Ad (advertisement) server 227 comprises a component or device that stores advertisements to provide to users. Although ad server 227 is shown as part of a back-end system 122, it may be an external server that is accessed by back-end system 122. Ad server 227 stores advertisements that are referenced by an identifier. The identifier is referred to herein as an "Ad-ID". An Ad-ID is a unique to a particular advertisement. According to the embodiments described herein, an Ad-ID is also global or uniform across different media channels. Therefore, regardless of the media channel being used to provide content to a consumer, the Ad-ID is understood across all media channels as distinctive to a specific advertisement.

Figure 3:
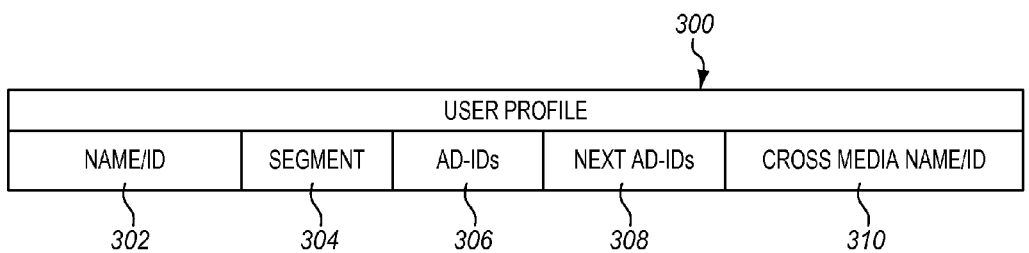
FIG. 3 illustrates a user profile in an exemplary embodiment.

Database 228 comprises a component or device that stores user profiles for consumers, along with other data, applications, files, etc. For example, database 228 may store a user profile for each consumer that includes a name, an address, and a phone number of the consumer, a level of service or plan for the consumer, etc. The user profile for a consumer may indicate any data regarding the consumer for providing targeted advertisements. FIG. 3 illustrates a user profile 300 in an exemplary embodiment. User profile 300 includes a name or identifier (ID) field 302, a segment field 304, an Ad-ID field 306, a next AD-ID field 308, and a cross media name/ID field 310. The name/ID field 302 includes information that identifies the user within the media channel. The segment field 304 indicates one or more advertisement classifications of the user within the media channel. For example, an advertisement classification may be "sports", "pets", "finance", etc. The Ad-ID field 306 includes the Ad-IDs for advertisements provided to the user over the media channel. The next Ad-ID field 308 includes Ad-IDs for advertisements selected to be provided to the user over the media channel. The cross media name/ID field 310 includes information that identifies the user within a different media channel. As a user may have different names or IDs within different media channels, this field 310 indicates the name or ID of the user in one or more different media channels.

Assume for this embodiment that ad selection controller 226 populates a user profile 300 as shown in FIG. 3 for user 150 that is accessing content over media channel 120 (see FIG. 1). Ad selection controller 226 is configured to provide targeted advertising to user 150 in media channel 120. In this embodiment, ad selection controller 226 is enhanced to provide target advertising to user 150 based on information provided by other media channels, such as media channels 110, 130, and 140. Because back-end systems in the other media channels may also be selecting advertisements for user 150, these back-end systems may have information to share with ad selection controller 226 regarding advertisements they have selected for user 150. Previously, each media channel was independent and would select target advertising (if applicable) based on activities of a user within that media channel. Ad selection controller 226 is able to query other media channels for information regarding user 150 in order to provide advertising that is even more targeted to user 150.

Figure 4:
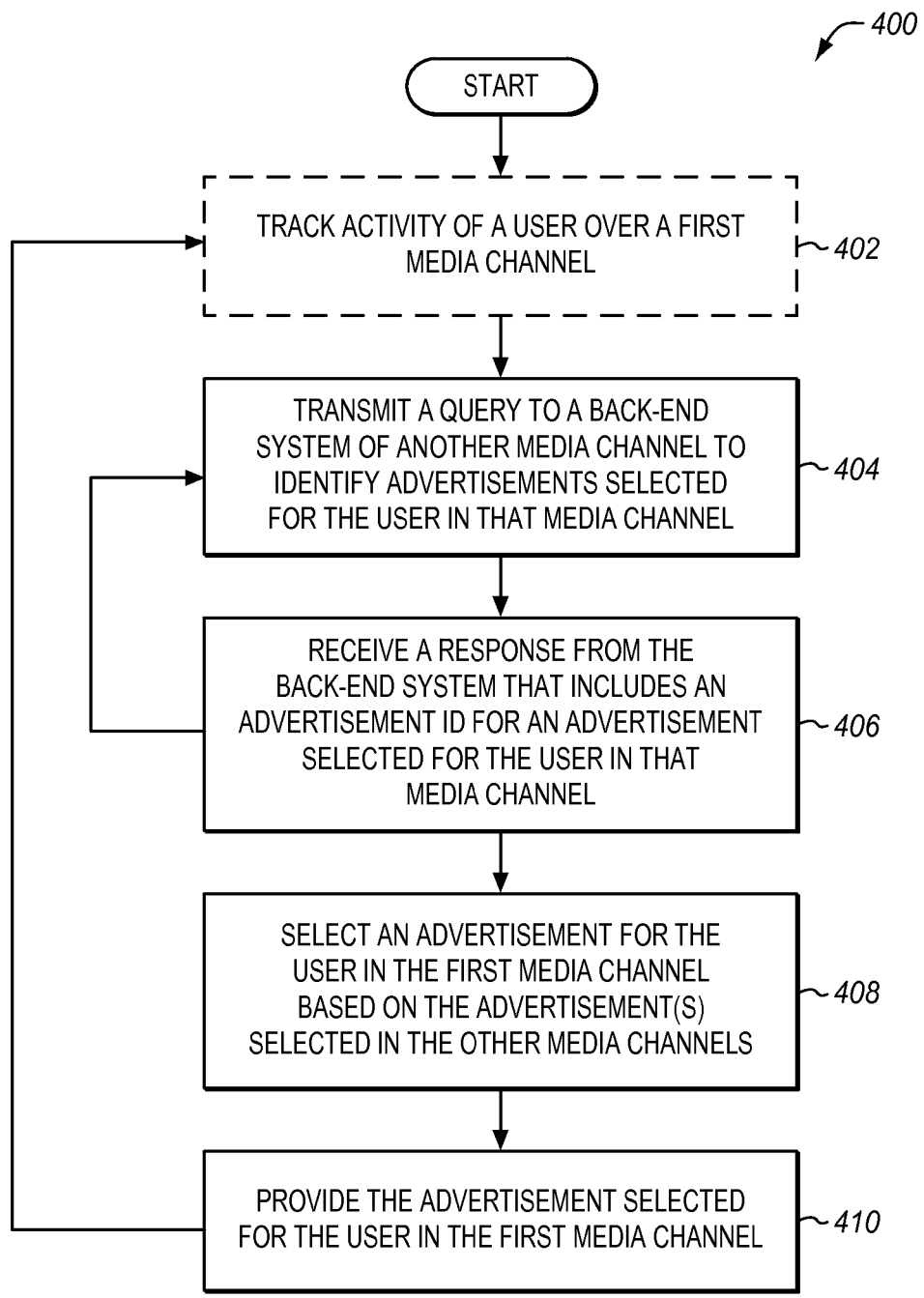
FIG. 4 is a flow chart illustrating a method for providing a targeted advertisement to a user in an exemplary embodiment.

FIG. 4 is a flow chart illustrating a method 400 for providing a targeted advertisement to a user in an exemplary embodiment. The steps of method 400 will be described with reference to back-end system 122 in FIGS. 1-2, but those skilled in the art will appreciate that method 400 may be performed in other systems. Also, the steps of the flow charts described herein are not all inclusive and may include other steps not shown, and the steps may be performed in an alternative order.

To provide targeting advertisements for user 150, ad selection controller 226 may perform data mining operations to determine interests of user 150. In one example, ad selection controller 226 may track the activity of user 150 over media channel 120 (step 402). For example, if media channel 120 comprises Internet, then ad selection controller 226 may monitor searches performed by user 150, queries by user 150, purchases made by user 150, etc. In this embodiment, ad selection controller 226 also queries back-end systems of other media channels to determine what types of advertisements have been selected for user 150 in those media channels. Therefore, ad selection controller 226 transmits a query (through interface 224) to back-end system 132 of media channel 130 to identify advertisements selected for user 150 in that media channel (step 404). Ad selection controller 226 may insert a name or ID for user 150 in the query, a location for user 150, or another other data for user 150.

Ad selection controller 226 then receives a response from back-end system 132 that includes Ad-IDs for the advertisements selected for user 150 in media channel 130 (step 406). As described above, the Ad-IDs are global across the different media channels. Therefore, an Ad-ID selected in media channel 130 is understood in media channel 120, and so on.

Ad selection controller 226 may query other back-end systems 112 and 142 of other media channels 110 and 140 in a similar fashion to identify the advertisements selected for user 150 in those media channels. Back-end system 122 may use any desired real-time protocol to communicate with the other back-end systems. For example, the back-end systems may use UDP/IP for communication, particularly if the connections between the back-end systems are reliable. Alternatively, the back-end systems may use TCP/IP for communication.

Ad selection controller 226 then selects an advertisement for user 150 in media channel 120 (step 408). The selection by ad selection controller 226 may be based on the advertisements selected in other media channels (e.g., media channel 130), based on activities of user 150 within its own media channel 120, or any other information. For example, ad selection controller 226 may select the same advertisement that was selected in media channel 130 as indicated by the Ad-ID. In another example, ad selection controller 226 may select an advertisement similar to or in the same area of interest as the advertisement selected in media channel 130. The selection of the advertisement in media channel 120 is a matter of design choice.

Ad selection controller 226 then provides (through interface 224) the selected advertisement to user 150 (step 410). To provide the advertisement, ad selection controller 226 may query ad server 227 using the selected Ad-ID to retrieve the advertisement related to the Ad-ID. Ad selection controller 226 may then insert the advertisement into the content provided to user 150. The manner in which ad selection controller 226 provides the selected advertisement may depend on the type of media channel. For instance, if media channel 120 comprises Internet, then ad selection controller 226 may provide the advertisement as a pop-up message, may insert the advertisement into a web page, etc.

Ad selection controller 226 may also update the user profile 300 for user 150 based on the selected advertisement. In FIG. 3, ad selection controller 226 may insert the Ad-ID for the selected advertisement in the "Ad-ID" field of user profile 300 to indicate that this advertisement was provided to user 150.

Figure 5:
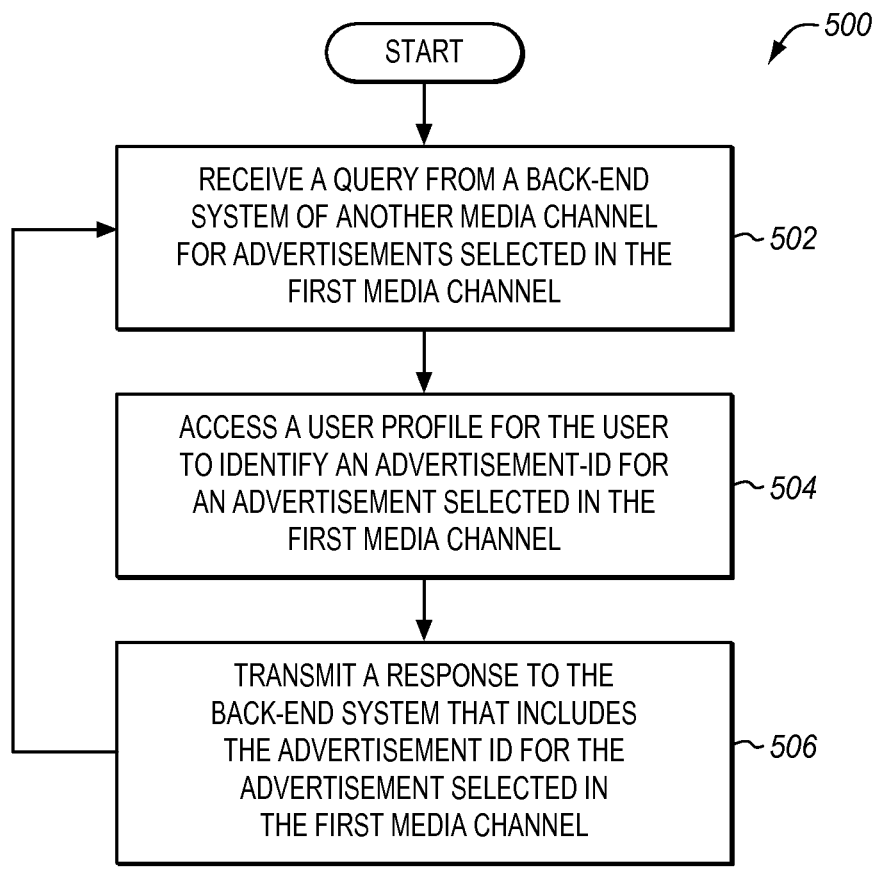
FIG. 5 is a flow chart illustrating a method for responding to other back-end systems in an exemplary embodiment.

In addition to querying other back-end systems, ad selection controller 226 is able to respond to queries from other back-end systems. FIG. 5 is a flow chart illustrating a method 500 for responding to other back-end systems in an exemplary embodiment. The steps of method 500 will be described with reference to back-end system 122 in FIGS. 1-2, but those skilled in the art will appreciate that method 500 may be performed in other systems.

One assumption is that another back-end system, such as back-end system 130, is operating to provide a targeted advertisement to user 150. Much like back-end system 120 is able to query other back-end systems, back-end system 130 may transmit a query to back-end system 120 to identify advertisements selected for user 150 in media channel 120. Thus, ad selection controller 226 in back-end system 120 receives the query (through interface 224) from back-end system 130 requesting Ad-IDs for advertisements selected for user 150 in media channel 120 (step 502). In response to the query, ad selection controller 226 accesses the user profile 300 for user 150 to identify the advertisements selected for user 150 in media channel 120 (step 504). For example, ad selection controller 226 may access the "Ad-ID" field or the "Next Ad-ID" field to identify the Ad-IDs for the advertisements that have been selected for user 150 in media channel 120. Ad selection controller 226 then transmits a response to back-end system 130 that includes the Ad-IDs for the advertisements selected for user 150 in media channel 120 (step 506).

Because a global Ad-ID is defined for advertisements across different media channels, back-end systems may exchange information regarding advertisements that have been provided in their respective media channels. Therefore, instead of each media channel acting independently when selecting advertisements, the back-end systems can collaborate so that more targeted advertisements can be provided to user 150 in each media channel. Also, some media channels are more conducive to collecting information about the preferences of user 150. For example, Internet and mobile phones provide a platform where user 150 is more likely to indicate his/her interests (e.g., web searches, purchases, etc.), whereas broadcast media channels, such as television and radio are less likely to have such an interaction with user 150. The embodiments described above allow those media channels, which are able to obtain more information about user 150, to share their advertising selections with other media channels so that each media channel can target its advertising to individual users.

EXAMPLE

Figure 6:
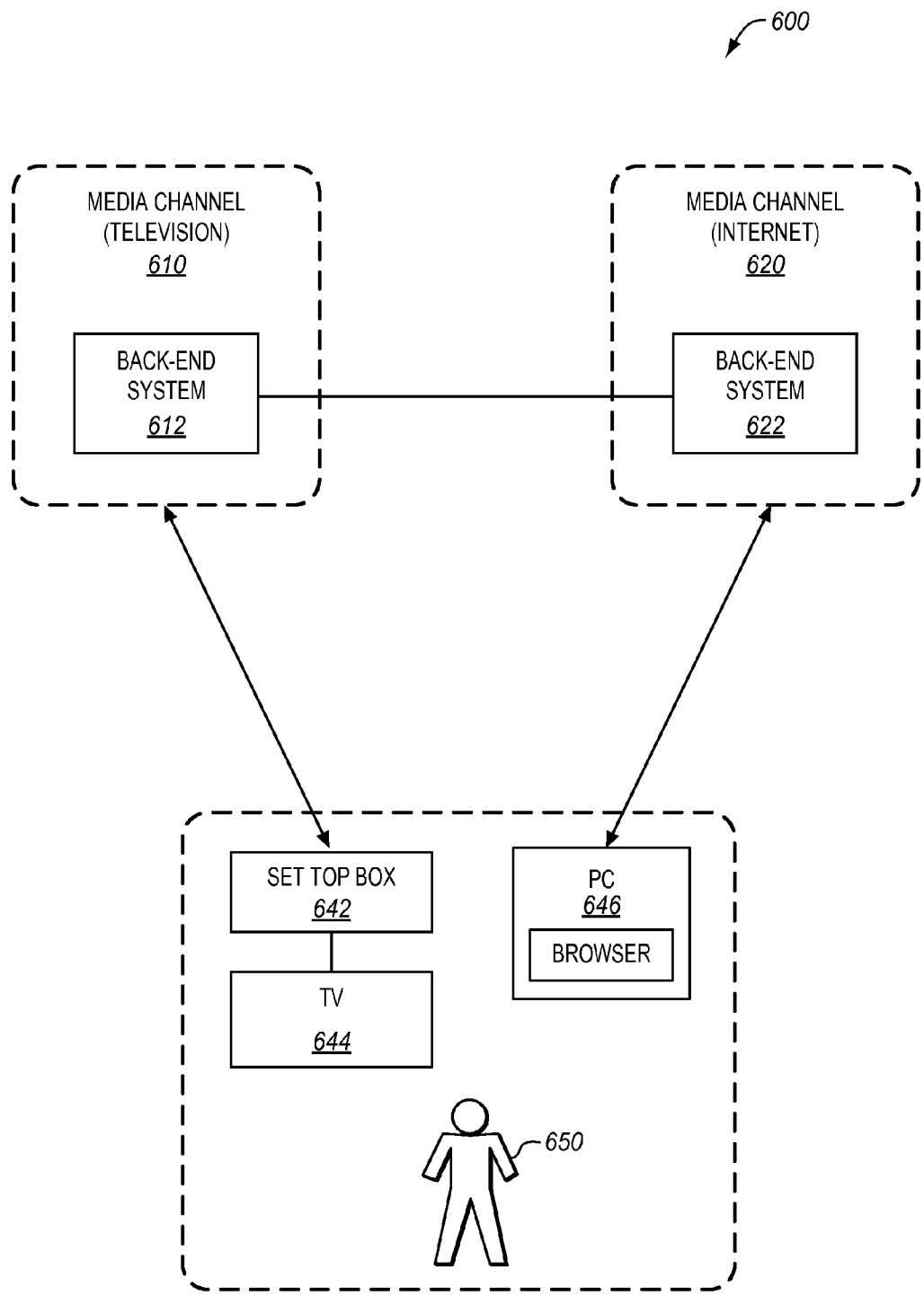
FIG. 6 illustrates a communication system in another exemplary embodiment.

FIG. 6 illustrates a communication system 600 in another exemplary embodiment. System 600 includes two media channels 610 and 620 that provide content to a user 650. Media channel 610 comprises television, and media channel 620 comprises Internet. To access media channels 610 and 620, user 650 has equipment (sometimes referred to as customer premises equipment) and the appropriate subscriptions. For example, to access media channel 610, user 650 has a set top box 642 and a television (TV) 644. User 650 may also have a subscription with a cable provider, a satellite provider, etc., to gain access to media channel 610. User 650 also has a computer (PC) 646 with an associated browser to access media channel 620. User 650 may also have a subscription with an Internet Service Provider (ISP) to gain access to media channel 620.

Figures 7, 8:
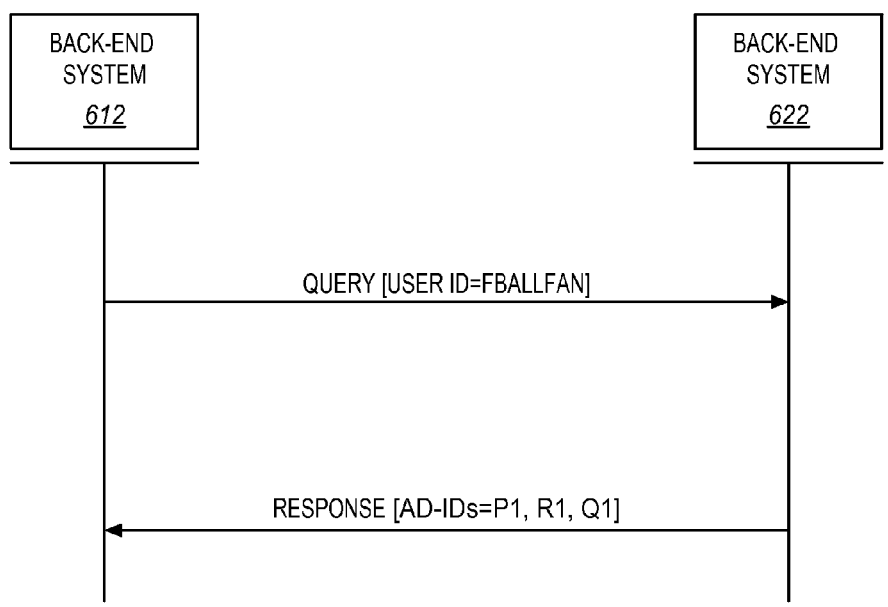
FIG. 7 illustrates a user profile for a user in a media channel in an exemplary embodiment.
FIG. 8 is a message diagram illustrating communication between back-end systems in an exemplary embodiment.

Media channel 610 includes a back-end system 612 that stores a user profile for user 650. The user profile indicates, among other things, advertisements that have been selected for user 650 in media channel 610. FIG. 7 illustrates a user profile 700 for user 650 in media channel 610 in an exemplary embodiment. User profile 700 includes a name or identifier (ID) field 702 which indicates the name of user 650 in media channel 610 as "Czar23". The segment field 704 indicates the segment of advertisements that are of interest to user 650, which is "pets". The Ad-ID field 706 indicates the Ad-IDs for the advertisements provided to user 650 in media channel 610. The next AD-ID field 708 indicates the Ad-IDs for advertisements selected to be provided to user 650 in media channel 610. The cross media name/ID field 710 indicates the name(s) or ID(s) of user 650 in other media channels, such as media channel 620. For example, in print media, user 650 may have an ID of "John Doe". In Internet media, user 650 may have an ID of "Fballfan". Therefore, if back-end system 612 wants to serve advertisements to user 650, back-end system 612 can query a print media back-end for "John Doe" and Internet back-end for "Fballfan". User 650 may have other IDs for other media channels that can likewise be queried.

Back-end system 612 is able to provide content to user 650, which is television content in this example. Back-end system 612 is also configured to select targeted advertisements for user 650 in media channel 610. To select advertisements, back-end system 612 may have information about user 650, such as location, age, gender, likes/dislikes, etc. This information may be gathered when user 650 signed up for service, or may be gathered in another way. Back-end system 612 may also track television channels viewed by user 650, such as sports channels, news channels, etc. To select an advertisement for user 650, back-end system 612 is also able to collect information from back-end system 622 of media channel 620. FIG. 8 is a message diagram illustrating communication between back-end systems in an exemplary embodiment. Back-end system 612 formats a query to back-end system 622 requesting Ad-IDs selected for user 650 in media channel 620. Back-end system 612 inserts the name/ID for user 650 (i.e., "Fballfan") used in media channel 620, and sends the query to back-end system 622. The query may include other information regarding user 650, such as location.

Back-end system 622 receives the query from back-end system 612. Back-end system 622 is also configured to select targeted advertisements for user 650 in media channel 620. To select advertisements, back-end system 622 may have information about user 650, such as location, age, gender, likes/dislikes, etc. Back-end system 622 may also track activities of user 650 in media channel 620, such as searches, purchases, etc.

Back-end system 622 also stores a user profile for user 650. FIG. 9 illustrates a user profile 900 for user 650 in media channel 620 in an exemplary embodiment. User profile 900 includes a name or ID field 902 which indicates the name of user 650 in media channel 620 as "Fballfan". The segment field 904 indicates the segment of advertisements that are of interest to user 650, which is "sports". The Ad-ID field 906 indicates the Ad-IDs for the advertisements provided to user 650 in media channel 620. The next Ad-ID field 908 indicates the Ad-IDs for advertisements selected to be provided to user 650 in media channel 620. The cross media name/ID field 910 indicates the name(s) or ID(s) of user 650 in other media channels. For example, in print media, user 650 has an ID of "John Doe". In TV media, user 650 has an ID of "Czar23".

In response to the query from back-end system 612, back-end system 622 accesses user profile 900 to identify Ad-IDs selected for user 650 in media channel 620. The Ad-IDs are "P1", "R1", and "Q1". These Ad-IDs are merely examples, as the actual Ad-IDs may be defined by an industry standard for advertising agencies (e.g., http://www.ad-id.org). Although the format for the Ad-IDs may be standardized, they are global across multiple media channels are not specific to any particular media channel. Therefore, back-end systems across different media channels are able to understand and handle the Ad-IDs. Back-end system 622 then formats a response that includes the Ad-IDs selected for user 650 in media channel 620, and sends the response to back-end system 612.

After receiving the response, back-end system 612 selects an advertisement for user 650 in media channel 610. Back-end system 612 may select the advertisement based on the Ad-IDs (i.e., P1, R1, and Q1) provided by back-end system 622, based on information regarding user 650, or any other information. Back-end system 612 then provides the selected advertisement to user 650. For example, back-end system 612 may insert the Ad-ID for the selected advertisement in the video content provided to set top box 642. Set top box 642 may then parse the video content to identify the Ad-ID, and retrieve the advertisement related to the Ad-ID from a local memory, from an external database, etc.

Back-end system 612 may also update the user profile 700 for user 650. FIG. 10 illustrates an updated user profile for user 650 in an exemplary embodiment. As illustrated in FIG. 10, back-end system 612 may update user profile 700 to include the Ad-IDs provided by back-end system 622. If back-end system 612 provides the advertisement identified by "P1", then back-end system 612 updates user profile 700 by adding "P1" to the "Ad-IDs" field 706 of user profile 700. Back-end system 612 may also add "R1" and "Q1" to the "Next Ad-IDs" field 708 of user profile 700, as these advertisements may be provided next.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. A system comprising:
   a first back-end system of a television media channel that provides content to a user over the television media channel through first user equipment, the first back-end system comprising:
   a first ad selection controller that tracks first activity of the user in the television media channel, and identifies candidate advertisements for the user for the television media channel based on the first activity; and
   an interface that communicates with a second back-end system of an Internet media channel that provides content to the user through second user equipment, wherein the second back-end system includes a second ad selection controller that tracks second activity of the user in the Internet media channel, and identifies candidate advertisements for the user for the Internet media channel based on the second activity, wherein the first back-end system and the second back-end system are operated by different service providers;
   the first ad selection controller transmits, through the interface, a query to the second back-end system to determine that the second ad selection controller previously provided a target advertisement to the user over the Internet media channel based on the second activity;
   the first ad selection controller receives, through the interface, a response to the query from the second back-end system that includes an advertisement identifier for the target advertisement previously provided to the user over the Internet media channel by the second ad selection controller, wherein the advertisement identifier is globally defined for the first back-end system and the second back-end system which are operated by the different service providers to uniformly refer to the target advertisement in the television media channel and the Internet media channel;
   the first ad selection controller, responsive to the response from the second back-end system, modifies the candidate advertisements identified for the user for the television media channel to include the target advertisement previously provided to the user over the Internet media channel by the second ad selection controller, selects an advertisement for the user for the television media channel from the modified candidate advertisements based at least in part on the target advertisement previously provided to the user over the Internet media channel, and provides the advertisement to the first user equipment of the user over the television media channel using the advertisement identifier.

2. The system of claim 1 wherein:
the first ad selection controller determines a user identifier for the user in the Internet media channel, and inserts the user identifier in the query to the second back-end system of the Internet media channel.

3. A method of providing an advertisement to a user over a television media channel, wherein the user accesses content over the television media channel using first user equipment, and accesses content over an Internet media channel using second user equipment, the method comprising:
providing, with a first back-end system of the television media channel, the content to the first user equipment over the television media channel, wherein the first back-end system includes a first ad selection controller for tracking first activity of the user in the television media channel, and identifying candidate advertisements for the user for the television media channel based on the first activity;
transmitting a query from the first back-end system of the television media channel to a second back-end system of the Internet media channel to determine that a second ad selection controller of the second back-end system previously provided a target advertisement to the user over the Internet media channel based on the second activity, wherein the first back-end system and the second back-end system are operated by different service providers;
receiving a response in the first back-end system from the second back-end system that includes an advertisement identifier for the target advertisement previously provided to the user over the Internet media channel by the second ad selection controller, wherein the advertisement identifier is globally defined for the first back-end system and the second back-end system which are operated by the different service providers to uniformly refer to the target advertisement in the television media channel and the Internet media channel;
modifying, with the first ad selection controller, the candidate advertisements identified for the user for the television media channel to include the target advertisement previously provided to the user over the Internet media channel by the second ad selection controller;
selecting, at the first ad selection controller, the advertisement for the user for the television media channel from the modified candidate advertisements based at least in part on the target advertisement previously provided to the user over the Internet media channel; and
providing the advertisement from the first back-end system to the first user equipment of the user over the television media channel using the advertisement identifier.

4. The method of claim 3 further comprising:
determining a user identifier for the user in the Internet media channel; and
inserting the user identifier in the query to the second back-end system of the Internet media channel.

5. A non-transitory computer readable medium embodying programmed instructions in a first back-end system of a television media channel for providing an advertisement to a user over the television media channel through a first ad selection controller, the instructions, when executed by a processor, direct the processor to:
track, with the first ad selection controller, first activity of the user in the television media channel;
identify candidate advertisements for the user for the television media channel based on the first activity;
communicate with a second back-end system of an Internet media channel that provides content to the user over the Internet media channel through second user equipment, wherein the second back-end system includes a second ad selection controller that tracks second activity of the user in the Internet media channel, and identifies candidate advertisements for the user over for the Internet media channel based on the second activity, wherein the first back-end system and the second back-end system are operated by different service providers;
transmit a query from the first back-end system to a second back-end system of the second media channel to determine that the second ad selection controller previously provided a target advertisement to the user over the Internet media channel based on the second activity;
receive a response in the first back-end system from the second back-end system that includes an advertisement identifier for the target advertisement previously provided to the user over the Internet media channel by the second ad selection controller, wherein the advertisement identifier is globally defined for the first back-end system and the second back-end system which are operated by the different service providers to uniformly refer to the target advertisement in the television media channel and the Internet media channel;
responsive to the response from the second back-end system, implement the first ad selection controller to modify the candidate advertisements identified for the user for the television media channel to include the target advertisement previously provided to the user over the Internet media channel by the second ad selection controller, and select an advertisement for the user for the television media channel from the modified candidate advertisements based at least in part on the target advertisement previously provided to the user over the Internet media channel; and
provide the advertisement from the first back-end system to the first user equipment of the user over the television media channel using the advertisement identifier.

6. The computer readable medium of claim 5 wherein the programmed instructions further direct the processor to:
determine a user identifier for the user in the Internet media channel; and
insert the user identifier in the query to the back-end system of the Internet media channel.

* * * * *